Feb. 28, 1956 V. B. BRITTON 2,736,286
PIPE AND FLANGE ALIGNER
Filed March 28, 1952 2 Sheets-Sheet 1
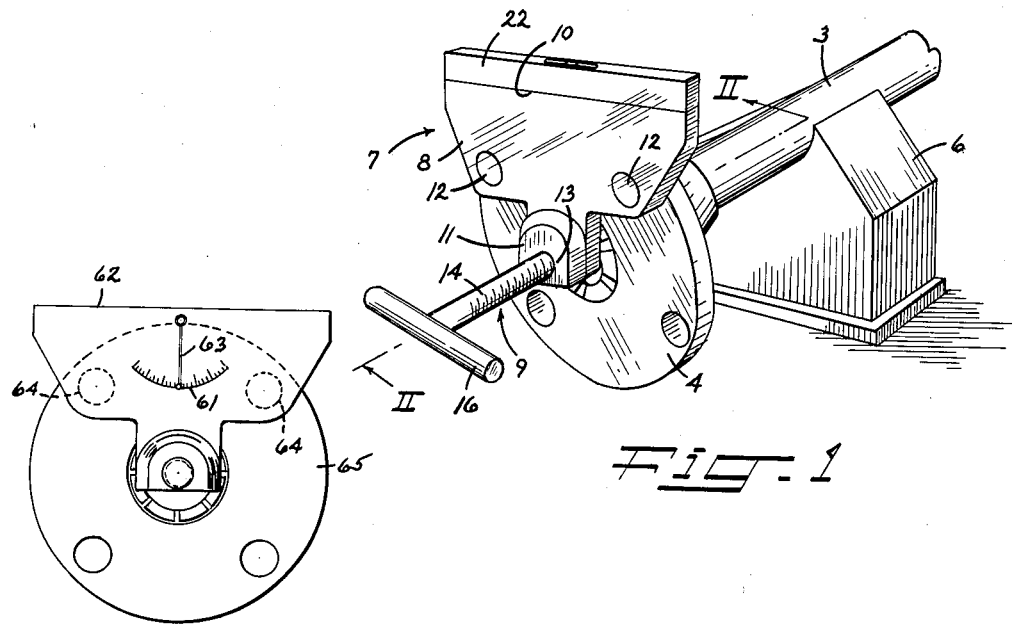
Fig. 1
Fig. 7
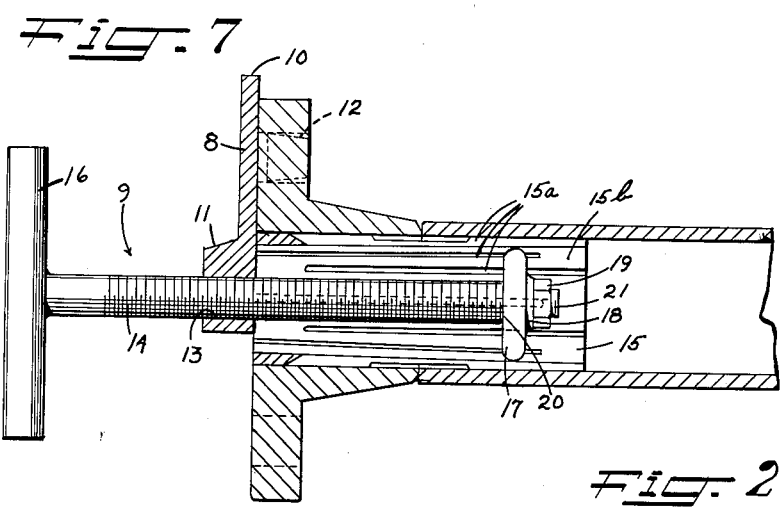
Fig. 2
INVENTOR.
VANCE B. BRITTON
BY
Thomas B. McNally
ATTORNEY.

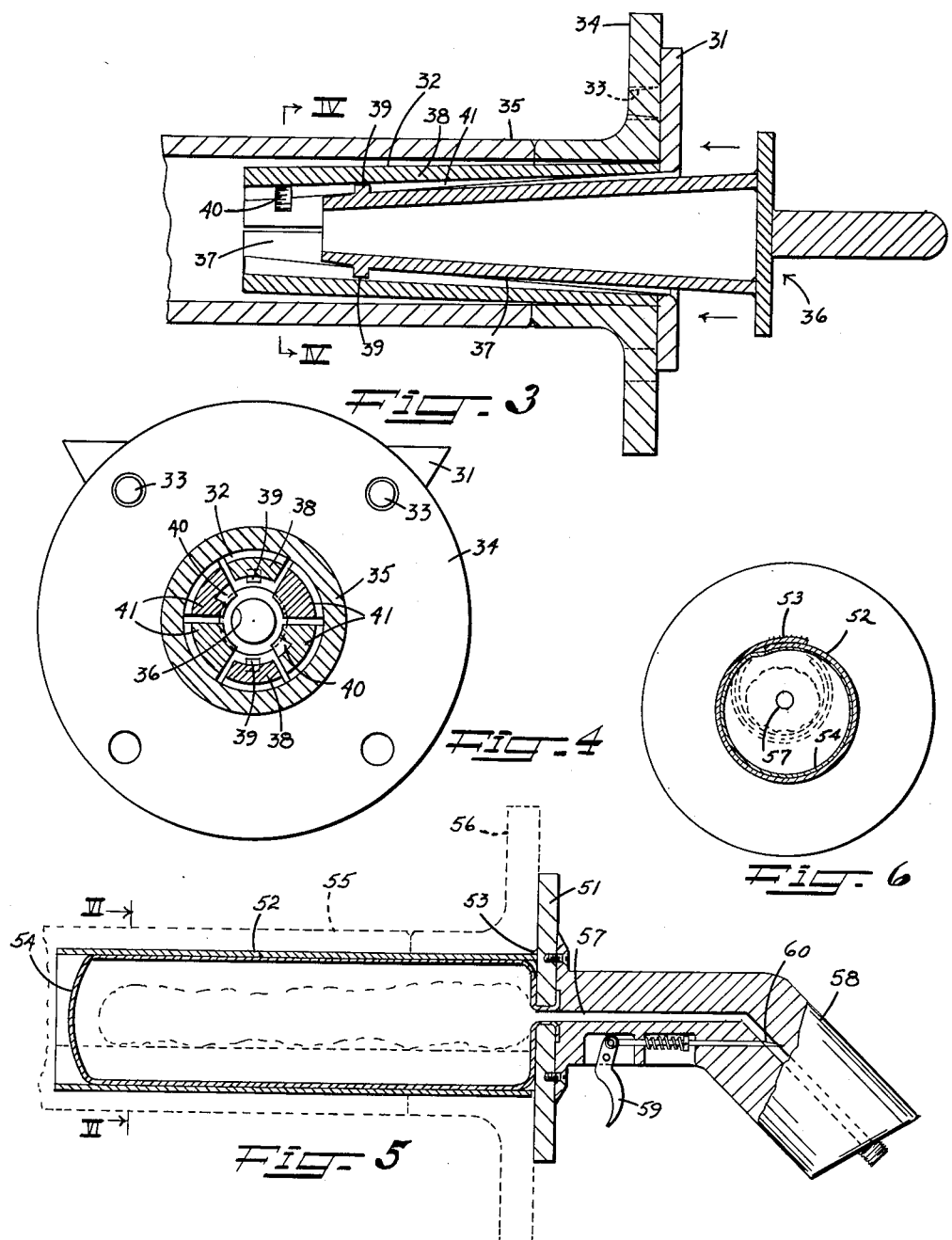

United States Patent Office 2,736,286
Patented Feb. 28, 1956

2,736,286

PIPE AND FLANGE ALIGNER

Vance B. Britton, Nitro, W. Va., assignor to American Viscose Corporation, Philadelphia, Pa., a corporation of Delaware Application March 28, 1952, Serial No. 279,140

1 Claim. (Cl. 113—102)

The present invention relates to a novel and improved fixture which is useful in the art of welding flanges to metal pipes and other cylindrical objects. More particularly the present invention relates to a novel and improved means for properly and readily supporting a flange adjacent the extremity of a pipe to which it is to be welded.

In the past, various manual rigging and blocking techniques have been employed during such a welding operation. However, due to the human element involved in placing and holding the flange adjacent the extremity of the pipe, the welding thereof oftentimes takes place when the flange is in an improper position with the result that the conventional bolt holes in the flange on one section of pipe will not properly align with the bolt holes in the flanged portion of a second section of pipe to which the first pipe is to be bolted. Thus, where prior techniques are used, although much time is often consumed, accurate alignment is rarely achieved.

It is a principal object of the present invention to provide a novel and improved mechanical holding and aligning fixture wherein a flange and the pipe to which it is to be welded may be readily and accurately positioned during the welding operation.

Other objects and advantages of the invention will be apparent from the following description.

In the drawing which is illustrative of the invention,

Fig. 1 is a perspective of one embodiment of the present invention wherein a flange is shown positioned in proper association with the pipe to which it is to be welded;

Fig. 2 is a section along reference line II—II in Fig. 1;

Fig. 3 is an elevational view in section of another embodiment of the present invention;

Fig. 4 is a section along reference line IV—IV in Fig. 3;

Fig. 5 is an elevational view in section of still another embodiment of the present invention;

Fig. 6 is a section along reference line VI—VI in Fig. 5;

Fig. 7 is a modified aligning fixture which might be employed in any of the preceding embodiments of the present invention.

In general the improved flange positioning and aligning fixture of the present invention comprises an expandable and contractable element which is adapted to be inserted through the flange and into the open end of the pipe, means for at times causing the said element to expand and frictionally engage the inner walls of the flange and the pipe and for at other times permitting it to slide freely therein, and a plate member secured to the said element such that the rotational position of the flange with respect to the pipe may be accurately controlled. It has been found that with such a fixture a flange may be readily and properly secured to an end of the pipe to which it is to be welded with a minimum of effort.

A first preferred embodiment of the present invention is disclosed in Figs. 1 and 2 of the drawing. As illustrated therein, a section of pipe 3 to which the flange 4 is to be welded may be properly positioned in any convenient manner such as upon blocks similar to the supporting block 6. The flange positioning device which is designated generally in the drawing by the reference numeral 7 comprises the sleeve member 15, the sleeve member expanding and contracting means 9 and the flange orienting plate member 8 attached thereto. The expandable body of the sleeve member 15, which is adapted to be inserted through the flange and into the open end of the pipe 3, includes a bore which is tapered in diameter from one extremity of the sleeve toward the other. The slots 15a, which are spaced substantially equally about the periphery of the sleeve, extend inwardly along the length thereof alternately from its opposite ends thereby forming resilient fingers and permitting a controlled expansion and contraction thereof in a manner which will be explained more fully hereinafter.

The plate member 8, which is preferably secured by welding across one end of the sleeve member 15, includes the flat upper edge 10, the tapered studs 12 which extend outwardly substantially at right angles from the plate, and the threaded hub portion 11. The upper edge 10 provides a means whereby the proper rotational position of the flange with respect to the pipe may be accurately adjusted in a manner which will be explained more fully hereinafter. The studs 12 are positioned on the plate 10 along a line which is preferably substantially parallel to its upper edge 10. Accordingly, a horizontal disposition of an upper pair of conventional bolt holes in the flange which are engaged by the studs 12 may be readily obtained in a manner which will be disclosed more fully hereinafter.

It is to be understood that although as described hereinbefore a pair of flange engaging studs is preferably used, any greater or less number of studs could be employed without departing from the spirit or scope of the present invention.

The threaded shaft 14, which engages the complementary threaded aperture 13 in the hub 11, includes a suitable handle member 16 at one end and a disc-shaped cam member 17 secured by the washer 18 and nut 19 at the other end. The washer and cam member are preferably freely rotatable on the shaft 14 between a shoulder 20 thereon and the nut 19 which engages a predetermined number of threads on the reduced diameter end portion 21 of the shaft. The outside diameter of the cam 17 is formed such that it is preferably slightly less than the inside diameter of the outer end portion 15b of the sleeve but greater than the diameter of other portions of the sleeve due to the tapered construction thereof.

In using the above described embodiment of the present invention, the sleeve member 15 in its contracted position is first inserted through the flange 4 and into the open end of the pipe 3 such that the studs 12 on the plate member 8 engage an appropriate pair of bolt holes in the flange. A spirit level 22 is then placed and held on the flat upper edge 10 of the plate member 8. By observing the level 22 the operator can then accordingly rotate the flange 4 until the edge is horizontally disposed. Since the studs 12 are secured to the plate member on a line which is parallel to its upper edge 10, the selected pair of flange bolt holes which receive the studs are likewise horizontally disposed. Next, the operator rotates the threaded shaft 14 such that the cam member 17 will approach and engage a reduced diameter portion of the tapered sleeve. Since the cam member 17 is freely rotatable on the shaft 14, it will advance axially into the sleeve as the threaded shaft 14 is turned and will have no tendency to rotate relative thereto. In this way the end portions of the sleeve are caused to expand and frictionally contact the inner surfaces of the pipe 3 and the flange 4 thereby securely maintaining their previously adjusted relative positions. Thus with an assurance that an accurate and proper alignment will be obtained, the welding operation may then be performed in any convenient manner. It might be noted however that preferably the pipe and flange are initially only tack welded so that the aligning device may be removed prior to the final welding operation thereby protecting the same from undue heat damage.

It is to be understood that although the spirit level 22 in the above disclosed embodiment of the invention is described as being separate from the flange aligning device, it could be constructed integrally therewith without departing from the spirit or scope of the present invention.

Another embodiment of the present invention is disclosed in Figs. 3 and 4 of the drawing. As illustrated therein the flange orienting plate member 31 is secured, preferably by welding, adjacent one extremity of the expandable and contractable sleeve member 32. As in the previously described embodiment the tapered studs 33, which extend outwardly from the inner surface of the plate member 31, are adapted to engage and thereby control the rotational position of the flange 34 with respect to the pipe 35. The sleeve member 32 is slotted, preferably as shown, to facilitate a controlled expansion and contraction thereof as the plunger member 36 is respectively inserted and removed from the tapered bore 37 therein. The segments 38 of the sleeve 32 are preferably reduced in thickness as shown to facilitate the insertion of the plunger 36 with its protruding lugs 39 which are adapted to cooperate with the notched portions 40 of the adjacent segments 41 to lock the plunger in its innermost position and thereby maintain the sleeve in its expanded condition. Thus, in this embodiment of the present invention when the rotational position of the flange 34 has been properly adjusted with respect to the pipe 35 to which it is to be welded, the plunger 36 may be readily inserted in the tapered bore of the sleeve 32 and given a slight turn such that the lugs 39 engage the notched portions 40 and thereby maintain the sleeve in its expanded condition.

It is to be understood that although a pair of lugs 39 and notched portions 40 in the sleeve have been shown in the drawing, any greater or lesser number of the same could be employed without departing from the spirit or scope of the present invention.

A still further embodiment of the present invention is disclosed in Figs. 5 and 6 of the drawing. As illustrated therein the handle mounting plate member 51 is secured preferably by welding to the sheet metal coil member 52 as at 53. An expandable bag 54, which is preferably constructed from a heat resistant material such as silicone rubber or the like, is positioned inside the coil member such that upon inflation thereof the coil member 52 expands with the bag from the normally contracted position, shown in dotted outline in Fig. 6 of the drawing, and engages the inner walls of the pipe 55 and the flange 56. Any suitable inflating gas or liquid may be supplied to the bag 54 through the line 57 in the handle 58 which is suitably secured to the outer surface of the plate member 51. Supply of the gas or liquid is preferably controlled by the conventional trigger and needle valve means 59 and 60 which are shown diagrammatically in Fig. 5 of the drawing. Thus, in the operation of this embodiment of the present invention when the rotational position of the flange 56 has been properly adjusted with respect to the pipe 55 to which it is to be welded, the trigger 59 is merely depressed to permit sufficient inflation of the bag 44 such that the expanded coil member engages and grips the inner walls of the pipe and its flange.

A modified device which permits easy and accurate orientation of the rotational position of the flange on its associated pipe and which might be employed in any of the above described embodiments of the present invention is shown in Fig. 7 of the drawing. As illustrated therein the semicircular scale 61 is preferably inscribed on the face of the plate member 62 and suitably marked off in degrees or the like. The plumb line 63 is pivotally secured to the face of the plate member preferably adjacent the center of the semicircular scale. With such an arrangement when the studs 64 are inserted in an appropriate adjacent pair of bolt holes in the flange 65 in any desired angular position of the same on the pipe to which it is to be welded may be obtained. Since, as explained hereinbefore, the expandable flange and pipe gripping means used herewith is constructed and operated substantially in a manner similar to any of the above described embodiments of the invention, further explanation of the same is deemed unnecessary.

While preferred embodiments of the invention have been disclosed, the description is intended to be illustrative only and it is to be understood that changes and variations may be made without departing from the spirit and scope of the invention as defined by the appended claim.

I claim:

A fixture for clamping a pipe flange to a pipe section in abutting alignment for welding comprising an elongated sleeve having a tapered bore, said sleeve having a plurality of circumferentially spaced longitudinal slots extending along a portion of its length, with alternate slots opening at opposite ends of said sleeve to form radially expansible resilient fingers, a plate secured to one end of said sleeve and having a flat face disposed at right angles to the axis of said sleeve, said plate being of substantially greater radial extent than said bore, a shaft passing through said plate and having a threaded connection therewith, an actuating handle on one end of said shaft, said shaft being adapted to move longitudinally through said sleeve when rotated relative to said plate by said actuating handle, and an enlarged annular abutment secured on the end of said shaft remote from said handle and being mounted for rotation relative thereto, said abutment being adapted to be axially advanced into said tapered bore as said shaft is rotated to expand said resilient fingers outwardly against the internal walls of pipe flange and pipe section for maintaining the same clamped in aligned position relative to each other.

References Cited in the file of this patent

UNITED STATES PATENTS

| | | |
|---|---|---|
| 138,947 | Smith | May 13, 1873 |
| 725,874 | Riley | Apr. 21, 1903 |
| 892,287 | Morse | June 30, 1908 |
| 914,743 | McDonald | Mar. 9, 1909 |
| 1,813,096 | Stenner | July 7, 1931 |
| 1,878,725 | Stovall | Sept. 20, 1932 |
| 1,940,910 | Hickey | Dec. 26, 1933 |
| 2,080,906 | Boyer | May 18, 1937 |
| 2,323,039 | Hill | June 29, 1943 |
| 2,414,054 | McDermott | Jan. 7, 1947 |
| 2,447,491 | Corley | Aug. 21, 1948 |
| 2,452,985 | Bourdette | Nov. 2, 1948 |
| 2,524,168 | Harnish | Oct. 3, 1950 |
| 2,566,629 | Paxson | Sept. 4, 1951 |
| 2,583,343 | Newlon | Feb. 12, 1952 |
| 2,598,398 | Littell et al. | May 27, 1952 |
| 2,615,414 | Adams et al. | Oct. 28, 1952 |
| 2,667,139 | Campbell | Jan. 26, 1954 |

FOREIGN PATENTS

| | | |
|---|---|---|
| 142,253 | Great Britain | May 6, 1920 |